United States Patent
Lambertin et al.

(10) Patent No.: US 10,450,231 B2
(45) Date of Patent: Oct. 22, 2019

(54) PROCESS FOR PREPARING A COMPOSITE MATERIAL FROM AN ORGANIC LIQUID AND RESULTING MATERIAL

(71) Applicant: COMMISSARIAT A L'ENERGIE ATOMIQUE ET AUX ENERGIES ALTERNATIVES, Paris (FR)

(72) Inventors: David Lambertin, Caderousse (FR); Adrien Rooses, Avignon (FR); Fabien Frizon, Villeneuve les Avignon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 637 days.

(21) Appl. No.: 14/429,751

(22) PCT Filed: Sep. 19, 2013

(86) PCT No.: PCT/EP2013/069520
§ 371 (c)(1),
(2) Date: Mar. 19, 2015

(87) PCT Pub. No.: WO2014/044776
PCT Pub. Date: Mar. 27, 2014

(65) Prior Publication Data
US 2015/0232387 A1 Aug. 20, 2015

(30) Foreign Application Priority Data

Sep. 21, 2012 (FR) .................................. 12 58880

(51) Int. Cl.
*C04B 16/02* (2006.01)
*C04B 28/00* (2006.01)
(Continued)

(52) U.S. Cl.
CPC ........ *C04B 28/006* (2013.01); *C04B 40/0039* (2013.01); *C04B 40/0046* (2013.01);
(Continued)

(58) Field of Classification Search
CPC .. C04B 7/00; C04B 7/34; C04B 28/00; C04B 32/00; C04B 16/00; C04B 24/00; C04B 16/02
(Continued)

(56) References Cited

U.S. PATENT DOCUMENTS

| 4,859,367 A | 8/1989 | Davidovits |
| 8,968,463 B2 | 3/2015 | Lambertin et al. |

(Continued)

FOREIGN PATENT DOCUMENTS

| DE | 38 40 794 A1 | 6/1990 |
| EP | 1 887 065 B1 | 2/2008 |

(Continued)

OTHER PUBLICATIONS

IAEA. Treatment and conditioning of radioactive organic liquids, IAEA-TECDOC656. 1992.
(Continued)

*Primary Examiner* — James E McDonough
(74) *Attorney, Agent, or Firm* — Miles & Stockbridge, P.C.

(57) ABSTRACT

The present invention relates to a method for preparing a composite material from an organic liquid, consisting of preparing a geopolymer by dissolution/polycondensation of an aluminosilicate source in an activation solution comprising said organic liquid. The present invention also relates to the thereby prepared composite material.

12 Claims, 2 Drawing Sheets

(51) Int. Cl.
*C04B 40/00* (2006.01)
*C04B 7/00* (2006.01)
*C04B 7/34* (2006.01)
*C04B 32/00* (2006.01)
*C04B 16/00* (2006.01)
*C04B 24/00* (2006.01)
*C04B 111/00* (2006.01)

(52) U.S. Cl.
CPC ... *C04B 2111/00767* (2013.01); *Y02P 40/165* (2015.11); *Y02W 30/91* (2015.05); *Y02W 30/94* (2015.05); *Y02W 30/96* (2015.05)

(58) Field of Classification Search
USPC .......................................... 106/807, 638, 802
See application file for complete search history.

(56) References Cited

U.S. PATENT DOCUMENTS

| | | | |
|---|---|---|---|
| 2005/0096495 A1 | 5/2005 | Mason et al. | |
| 2011/0052921 A1* | 3/2011 | Gong ..................... | C04B 18/08 428/426 |
| 2011/0112272 A1* | 5/2011 | Seal ........................ | C04B 7/243 528/271 |
| 2012/0101324 A1* | 4/2012 | Leavitt ..................... | G21F 9/08 588/18 |
| 2013/0014670 A1 | 1/2013 | Lambertin et al. | |

FOREIGN PATENT DOCUMENTS

| | | |
|---|---|---|
| EP | 2 199 359 A1 | 6/2010 |
| SU | 854 904 A1 | 8/1981 |
| WO | 92/04298 A1 | 3/1992 |
| WO | 2010/121886 A1 | 10/2010 |
| WO | 2011/072777 A1 | 6/2011 |

OTHER PUBLICATIONS

Greenhalgh, The Immobilization of Organic Liquid Wastes, Handford Engineering Development Laboratory, USA. 1985.
Sora et al., Chemistry and microstructure of cement pastes admixed with organic liquids. Journal of the European Ceramic Society. 2002; 22:1463-73.
Montgomery et al., Optimization of Cement-Based Stabilization/Solidification of Organic-Containing Industrial Wastes Using Organophilic Clays. Waste Management & Research. 1991; 9: 21-34.
Pollard et al., Organic compounds in the cement based stabilisation/solidification of hazardous mixed wastes—Mechanistic and processconsiderations. Journal of Hazardous Materials. 1991; 28: 313-27.
Hebatpuria et al., Immobilization of phenol in cement-based solidified/stabilized hazardous wastes using regenerated activated carbon: leaching studies. Journal of Hazardous Materials. 1999; 70: 117-38.
Zhu et al., Sorption of Phenol, p-Nitrophenol, and Aniline to Dual-Cation Organobentonites from Water. Environmental Science & Technology. 1999; 34: 468-75.
Cassidy et al., Oil Immobilization Program at Sellafield: An Innovative Approach. WM 07. Tucson, USA 2007.
Nochar Newsletter. vol. 3, No. 1. 2005.
International Search Report for International Application No. PCT/EP2013/069520 dated Jan. 27, 2014.
French Search Report for French Application No. 1258880 dated Jun. 6, 2013.
J.S. Sindhunata et al.; "Effect of Curing Temperature and Silicate Concentration on Fly-Ash-Based Geopolymerization"; Ind. Eng. Chem. Res.; 2006; vol. 45; pp. 3559-3568.
Calvin Calmon; "Explosion Hazards of Using Nitric Acid in Ion-Exchange Equipment"; Chemical Engineering; Nov. 17, 1980; vol. 87; pp. 271-274.
Medri, Valentina et al.; "Effect of Metallic Si Addition on Polymerization Degree of in Situ Foamed Alkali-Aluminosilicates"; Ceramics International; 2013 vol. 39; pp. 7657-7668.
Riessen, Rickard et al.; "Performance of Solid and Cellular Structured Fly Ash Geopolymers Exposed to a Simulated Fire"; Cement and Concrete Composites; 2014; vol. 48; pp. 75-82.
Cilia Strozi et al.; "Geopolymer Foams by Gelcasting"; Ceramics International; 2014; vol. 40; pp. 5723-5730.
K.K.S. Pillay; "A Review of the Radiation Stability of Ion Exchange Materials"; Journal of Radioanalytical and Nuclear Chemistry; vol. 102; 1986; pp. 247-268.
Prud'Homme, E. et al.; "In Situ Inorganic Foams Prepared from Various Clays at Low Temperature"; Applied Clay Science; vol. 51; 2010; pp. 15-22.

* cited by examiner

PROCESS FOR PREPARING A COMPOSITE MATERIAL FROM AN ORGANIC LIQUID AND RESULTING MATERIAL

TECHNICAL FIELD

The present invention belongs to the technical field for disposal and conditioning of wastes and notably of possibly contaminated organic liquids.

The present invention relates to a method with which it is possible to prepare a composite material from an organic liquid and consequently allowing inertization of such a liquid by coating it and/or encapsulating it in a geopolymer.

The method according to the present invention thus gives the possibility of obtaining a composite material comprising a geopolymeric mineral matrix trapping an organic liquid. The present invention also relates to a composite material obtained according to the method of the present invention.

STATE OF THE PRIOR ART

Within the scope of managing nuclear wastes and research laboratory wastes notably in the chemical industry, organic liquids and more particularly oils, possibly contaminated, are stored in facilities while awaiting treatment.

Indeed, such organic liquids have, in addition to possible contamination, risks notably due to their volatility, their flammability and/or their explosivity.

Thus, at the present time, many methods are being studied for treating these organic wastes. Among the latter, mention may notably be made of incineration, aqueous oxidation, acid digestion, alkaline hydrolysis, distillation, absorption on mineral absorbents, cementation and absorption followed by cementation [1].

A comparative study carried out by the International Atomic Energy Agency (IAEA) of the different treatment methods for different organic nuclear wastes (oil, scintillator solution, extraction solvent) mentions the advantages and the drawbacks of each method [1]. It emerges therefrom that methods based on direct cementation and with a preliminary absorption step are easy to apply but the organic wastes are not destroyed and may be leached and especially the final volume of waste may increase significantly.

On direct cementation, important work was carried out in the USA in 1985 [2]. It consisted in direct immobilization of pump oil and of a TBP/dodecane mixture in Portland cement with additions of emulsifier and setting accelerator. The emulsifier was added in order to obtain a single phase between the water and the organic phase, and the setting accelerator in order to allow fast setting in order to obtain a monolithic block before separation of the aqueous and organic phases.

More recently, studies were carried out on the influence of liquid organic substances in Portland cements. These studies have shown that the presence of organic substances in Portland cement slurries causes a delay in hydration and structural defects which may cause significant leaching of organic compounds [3-5].

In the literature [5] it is recommended that immobilization of organic liquids in Portland cement should be accompanied by an absorption step and this, notably on active coals [6] or on clays [4, 7]. As examples, tests for treating used radioactive oils were conducted by the British Nuclear Group in Great Britain with immobilization of these oils on an absorbing polymer which is Nochar® [8, 9] and then a coating in Portland cement.

An international application on an immobilization method in a geopolymer of bituminous shale residues was published under number WO 2011/072777 [10]. In the described invention, the residues of bituminous shales which are in no way organic liquids require, before their immobilization, several preparatory steps. Indeed, these residues are obtained after a first milling step so as to obtain a grain size of less than 10 mm, followed by a combustion step at a temperature above 900° C., followed by a second milling step with which it is possible to obtain combustion residues having a grain size of less than 100 μm. The latter are mixed with reactive materials used for preparing the geopolymer such as flying ashes or calcined kaolin. The thereby obtained mixture is then activated with an activation solution comprising alkaline activators. It is to be noted that the heat treatment at a temperature above 900° C. causes decarbonization.

With view of the benefit as to obtaining of methods and of materials allowing inertization of possibly contaminated organic fluids, the inventors set their goal of proposing a simple, practical method, applicable on an industrial scale in order to prepare such materials which do not have the drawbacks of the methods listed above.

DISCUSSION OF THE INVENTION

The present invention gives the possibility of solving the drawbacks of the methods for conditioning organic liquids from the state of the art and attaining the goal set by the inventors, i.e. proposal of a method in which the organic liquids are inertized, conditioned and/or immobilized in a geopolymeric matrix.

Indeed, the inventors have shown that the highly basic pH of the activation solution not only allows a single phase to be maintained with the organic phase (i.e. the organic liquid to be inertized), but also to obtain a uniform geopolymeric block, once the addition of an aluminosilicate source and the geopolymerization process have been carried out.

The present invention therefore consists in direct immobilization of an organic liquid in a geopolymeric material in which the final material does not have any structural defect and in which no leaching phenomenon exits. It should be noted that, in the present invention, the organic waste changes state when it passes from a potentially flammable liquid state to a solid state of the geopolymer type in which the organic liquid is encapsulated or even micro-encapsulated.

The material of the geopolymer matrix type in which is incorporated the organic liquid, is therefore easy to prepare, easy to handle and ready for use.

The present invention relates to a method for preparing a composite material from an organic liquid, consisting of preparing a geopolymer by dissolution/polycondensation of an aluminosilicate source in an activation solution comprising said organic liquid.

More particularly, the present invention relates to a method for preparing a composite material from an organic liquid, consisting of preparing a geopolymer by dissolution/polycondensation of an aluminosilicate source in an activation solution comprising said organic liquid, said organic liquid representing between 0.5 and 70% by volume based on the total volume of said composite material, and said organic liquid comprising at most 50% of triglycerides by mass based on the total dry mass of said organic liquid.

By «composite material», is meant, within the scope of the present invention, an assembly of a geopolymeric matrix and of an organic liquid. This assembly may appear as an intimate mixture between the organic liquid and the geopolymeric matrix, as an encapsulation of the organic liquid by the geopolymeric matrix, as a micro-encapsulation of the organic liquid by the geopolymeric matrix and/or as a coating of the organic liquid by the geopolymeric matrix.

More particularly, the composite material according to the invention appears as a geopolymer (or geopolymeric matrix) in which microbeads and/or nanobeads of organic liquid are coated. By «microbead», is meant a droplet of an organic liquid for which the average diameter is comprised between 1 and 1,000 µm, notably between 10 and 900 µm and, in particular between 20 and 800 µm. By «nanobead», is meant an organic liquid droplet for which the average diameter is comprised between 1 and 1,000 nm, notably between 10 and 900 nm and, in particular between 20 and 800 nm. The microbeads and nanobeads of organic liquid present in the composite material according to the invention may have various shapes such as oval or spheroidal shapes.

Advantageously, the composite material according to the present invention only contains microbeads and/or nanobeads of organic liquid and a geopolymeric matrix.

By «organic liquid», is meant, within the scope of the present invention, a liquid comprising a compound and/or a solvent, said compound and said solvent having at least one carbon atom and notably at least two carbon atoms.

Advantageously, the organic liquid applied within the scope of the present invention is or comprises at least one element selected from the group consisting of an aliphatic hydrocarbon; an aromatic hydrocarbon; a chlorinated solvent; an oxygenated solvent such as an alcohol, a ketone, an ester, a glycol ester and an ether-oxide; an alkyl phosphate or an alkyl chloride. The hydrocarbons which may be used within the scope of the invention are notably hydrocarbons derived from kerosene and their derivatives.

Thus, an organic liquid applied within the scope of the present invention may be a degreasing agent or a notably mineral oil. By «degreasing agent», is meant a liquid able to remove a residue present at the surface of a support by putting it into contact with this support. By «oil», is meant a liquid non miscible with water or completely soluble in water at a concentration of less than or equal to 2% by weight and this at 25° C. and at atmospheric pressure.

The organic liquid applied within the scope of the present invention comprises at most 50% of triglycerides by mass based on the total dry mass of said organic liquid. By «triglyceride», is meant a compound of formula $H_2C(OR^1)$—$C(H)(OR^2)$—$C(OR^3)H_2$ with $R^1$, $R^2$ and $R^3$, either identical or different, representing a group of formula —C(=O)R with R representing a carbonaceous group. This carbonaceous group is notably a cyclic or branched, linear, saturated or unsaturated alkyl group of 1 to 40 carbon atoms, advantageously from 2 to 30 carbon atoms; optionally substituted and optionally comprising at least one heteroatom selected from the group formed by N, O, F, Cl, P, Si, Br and S.

In certain embodiments of the present invention, the organic liquid comprises at most 40%, notably at most 30%, in particular, at most 20% and most particularly, at most 10% of triglycerides by mass based on the total dry mass of said organic liquid. In a particular alternative, the organic liquid does not comprise any triglyceride as defined earlier.

Because of the limitations as to the triglycerides in the organic liquid, applied within the scope of the present invention, it is obvious that the latter can neither be a vegetable oil, nor a fat of animal origin such as bovine fat.

In particular, the organic liquid applied within the scope of the present invention is or comprises at least one element selected from the group consisting of a commercial scintillator liquid, benzene, toluene, xylene, ethylbenzene, kerosene, hexane, cyclohexane, octane, ethylcyclohexane, dodecane, eicosane, phenol, dichloromethane, trichloroethane, dichlorobenzene, trichloroethylene, 2-octanone, 4-dodecanone, tributyl phosphate (TBP), tetrahydrofurane (THF) and diethyl ether.

The organic liquid applied within the scope of the present invention may appear as a solution, an emulsion, a microemulsion, a suspension or a colloidal suspension.

Advantageously, the organic liquid applied within the scope of the present invention is an organic liquid waste, notably stemming from a nuclear facility, a research laboratory, a chemical industry, a hospital or a medical analysis laboratory. Thus, the organic liquid applied within the scope of the present invention may comprise one (or more) heavy metal(s), trace element(s) or radioelement(s) notably selected from tritium ($^3$H), carbon ($^{14}$C), chlorine ($^{36}$Cl), fluorine ($^{18}$F), potassium ($^{40}$K), calcium ($^{45}$Ca), cobalt ($^{60}$Co), nickel ($^{63}$Ni), sulfur, zinc, phosphorous, mercury, lead, cadmium, krypton ($^{85}$Kr), arsenic, strontium ($^{90}$Sr), ruthenium, cesium, a emitters such as americium, plutonium and uranium and mixtures thereof.

In a most particular alternative of the invention, the applied organic liquid is found in a supported form. By «supported organic liquid», is meant in the sense of the invention an organic liquid as defined earlier, mixed with a support or even maintained, deposited or grafted at the surface of said support by means of covalent bonds or non-covalent bonds with low energy such as hydrogen bonds or Van der Waals bonds. The support applied within the scope of this particular embodiment may be earth, sand, clay, rubble, granulate, gravel or one of their mixtures.

By «geopolymer» or «geopolymeric matrix», is meant within the scope of the present invention, a solid and porous material in the dry condition, obtained as a result of hardening a plastic mixture containing finely milled materials (i.e. the aluminosilicate source) and a saline solution (i.e. the activation solution), said plastic mixture being capable of setting and hardening over time. This mixture may also be designated under the terms of «geopolymeric mixture» or «geopolymeric composition». The hardening of the geopolymer is the result of dissolution/polycondensation of the finely milled materials of the geopolymeric mixture in a saline solution such as a saline solution with a high pH (i.e. the activation solution).

More particularly, a geopolymer or geopolymeric matrix is an amorphous aluminosilicate inorganic polymer. Said polymer is obtained from a reactive material essentially containing silica and aluminium (i.e. the aluminosilicate source), activated by a strongly alkaline solution, the solid/solution mass ratio in the formulation being low. The structure of a geopolymer consists of an Si—O—Al lattice formed with silicates ($SiO_4$) and aluminate ($AlO_4$) tetrahedra bound at their apices by sharing oxygen atoms. Within this lattice, are found one or more charge-compensating cations also called compensation cations which allow compensation of the negative charge of the $AlO_4^-$ complex. Said compensation cation(s) is(are) advantageously selected from the group consisting of alkaline metals such as lithium (Li), sodium (Na), potassium (K), rubidium (Rb) and cesium (Cs), earth alkaline metals such as magnesium (Mg), calcium (Ca), strontium (Sr) and barium (Ba) and mixtures thereof.

The expressions «reactive material essentially containing silica and aluminium» and «aluminosilicate source» in the present invention are similar and may be used interchangeably.

The reactive material essentially containing silica and aluminium which may be used for preparing the geopolymeric matrix applied within the scope of the invention is advantageously a solid source containing amorphous aluminosilicates. These amorphous aluminosilicates are notably selected from natural aluminosilicate minerals such as illite, stilbite, kaolinite, pyrophyllite, andalusite, bentonite, kyanite, milanite, grovenite, amesite, cordierite, feldspath, allophane, etc. . . . ; calcinated natural aluminosilicate minerals such as metakaolin; synthetic glasses based on pure aluminosilicates; aluminous cement; pumice; calcinated byproducts or residues of industrial exploitation such as flying ashes and blast furnace slags respectively obtained from combustion of coal and during the transformation of the iron ore into cast iron in a blast furnace; and mixtures thereof.

The saline solution with a strong pH, also known, in the field of geopolymerization, as an «activation solution», is a strongly alkaline aqueous solution which may optionally contain silicate components notably selected from the group consisting of silica, colloidal silica and glassy silica.

The expressions «activation solution», «saline solution of strong pH» and «strongly alkaline solution» in the present invention are similar and may be used interchangeably.

By «strongly alkaline» or «with a strong pH», is meant a solution for which the pH is greater than 9, notably greater than 10, in particular greater than 11 and more particularly greater than 12. In other words, the activation solution has an $OH^-$ concentration greater than 0.01 M, notably greater than 0.1 M, in particular greater than 1 M and, more particularly, comprised between 5 and 20 M.

The activation solution comprises the compensation cation or the mixture of compensation cations as an ionic solution or a salt. Thus, the activation solution is notably selected from a sodium silicate ($Na_2SiO_3$), potassium silicate ($K_2SiO_2$), sodium hydroxide (NaOH), potassium hydroxide (KOH), calcium hydroxide ($Ca(OH)_2$), cesium hydroxide (CsOH) aqueous solution and derivatives thereof etc. . . . .

Advantageously, the method according to present invention comprises the following steps:

a) preparing an activation solution comprising said organic liquid, b) adding to the solution obtained in step (a) at least one aluminosilicate source, c) submitting the mixture obtained in step (b) to conditions allowing hardening of the geopolymer.

The step (a) of the method according to the invention consists of adding to an activation solution as defined earlier, prepared beforehand, the organic liquid to be inertized, said organic liquid may be supported. The preliminary preparation of the activation solution is a standard step in the field of geopolymers.

As explained earlier, the activation solution may optionally contain one or several silicate components notably selected from the group formed by silica, colloidal silica and glassy silica. When the activation solution contains one or several silicate component(s), the latter is(are) present in an amount comprised between 100 mM and 10 M, notably between 500 mM and 8 M and, in particular between 1 and 6 M in the activation solution.

The organic liquid is added to the activation solution in one go or several times and even dropwise or by dusting in the case of a supported organic liquid. Once the organic liquid is added to the activation solution, the obtained solution is mixed by using a kneader, a stirrer, a magnetic stirrer, an ultrasonic bath or a homogenizer. The mixing/kneading during step (a) of the method according to the invention is accomplished at a relatively sustained speed. By «relatively sustained speed», is meant, within the scope of the present invention, a speed of more than 250 rpm, notably greater than or equal to 350 rpm. Such stirring gives the possibility of obtaining a uniform solution notably a homogenous solution or a solution of the micro-emulsion type.

The step (a) of the method according to the invention is carried out at a temperature comprised between 10° C. and 40° C., advantageously between 15° C. and 30° C. and, more particularly, at room temperature (i.e. 23° C.±5° C.) for a period of more than 6 h, notably more than 10 h, in particular comprised between 10 h and 48 h and, more particularly notably between 12 h and 36 h.

It is to be noted that it may be necessary during step (a) to use at least one surfactant, i.e. a molecule including a lipophilic (apolar) portion and a hydrophilic (polar) portion and this so as to obtain a uniform solution following step (a) of the method according to the invention. In other words, one or more surfactants may have to be added in order to increase the miscibility or the dispersion of the organic liquid in the activation solution.

The surfactant(s) may be added (i) to the activation solution before adding the organic liquid, (ii) to the organic liquid before its addition into the activation solution or (iii) to the activation solution in which the organic liquid has already been added.

Among the surfactants which may be used within the scope of the present invention, mention may be made of:

i) anionic surfactants for which the hydrophilic portion is negatively charged such as alkyl or aryl sulfonates, sulfates, phosphates, or sulfosuccinates associated with a counter-ion like an ammonium ion ($NH^{4+}$), a quaternary ammonium such as tetrabutylammonium, and alkaline cations such as $Na^+$, $Li^+$ and $K^+$. As anionic surfactants, it is for example possible to use tetraethylammonium paratoluenesulfonate, sodium dodecylsulfate, sodium palmitate, sodium stearate, sodium myristate, sodium di(2-ethylhexyl) sulfosuccinate, methylbenzene sulfonate and ethylbenzene sulfonate.

ii) cationic surfactants for which the hydrophilic portion is positively charged, notably selected from quaternary ammoniums including at least one aliphatic $C_4$-$C_{22}$ chain associated with an anionic counter ion notably selected from boron derivatives such as tetrafluoroborate or halide ions such as $F^-$, $Br^-$, $I^-$ or $Cl^-$. As cationic surfactants, it is for example possible to use tetrabutylammonium chloride, tetradecylammonium chloride, tetradecyltrimethyl ammonium bromide (TTAB), alkylpyridinium halides bearing an aliphatic chain and alkylammonium halides.

iii) zwitterionic surfactants which are neutral compounds having formal electric charges of one unit and of opposite sign, notably selected from the compounds having a $C_5$-$C_{20}$ alkyl chain generally substituted with a negatively charged function such as a sulfate or a carboxylate and a positively charged function like an ammonium. As zwitterionic surfactants, mention may be made of sodium N,N-dimethyldodecylammonium butanate, sodium dimethyldodecylammonium propanate and amino acids.

iv) amphoteric surfactants which are compounds behaving both as an acid or as a base depending on the medium in which they are placed. As amphoteric surfactants, it is possible to use disodium lauroamphodiacetate, betains like alkylamidopropylbetaine or laurylhydroxysulfobetaine.

v) neutral (non-ionic) surfactants for which the surfactant properties, notably hydrophilicity, are provided by non-charged functional groups such as an alcohol, an ether, an ester or further an amide, containing heteroatoms such as nitrogen or oxygen; due to the low hydrophilic contribution of these functions, non-ionic surfactant compounds are most often polyfunctional. As non-ionic surfactants, it is possible to use polyethers such as polyethoxylated surfactants such as for example polyethyleneglycol lauryl ether (POE23 or Brij® 35), polyols (surfactants derived from sugars) in particular glucose alkylates such as for example glucose hexanate.

The amount of surfactant(s) used within the scope of the present invention will greatly depend on the organic liquid and on the activation solution used in the method. One skilled in the art will be able to determine the adequate amount by means of routine tests. As an example, in the activation solution containing the organic liquid, the surfactant is present in a proportion comprised between 0.1 and 20%, notably between 0.5 and 15% and, in particular between 1 and 10% by volume based on the total volume of said solution.

Step (b) of the method according to the invention consists of putting into contact the activation solution comprising the organic liquid and optionally a surfactant and the aluminosilicate source as defined earlier.

The aluminosilicate source may be poured once or several times on the activation solution containing the organic liquid and optionally a surfactant. In a particular embodiment of step (b), the aluminosilicate source may be dusted over the activation solution containing the organic liquid and optionally a surfactant.

Advantageously, step (b) of the method according to the invention is applied in a kneader wherein the activation solution containing the organic liquid and optionally a surfactant has been introduced beforehand. Any kneader known to one skilled in the art may be used within the scope of the present invention. As non-limiting examples, mention may be made of a mixer NAUTA®, a kneader HOBART® and a kneader HENSCHEL®.

Step (b) of the method according to the invention therefore comprises mixing or kneading of the activation solution containing the organic liquid and optionally a surfactant with the aluminosilicate source. The mixing/kneading during step (b) of the method according to the invention is accomplished at a relatively slow speed. By «relatively slow speed», is meant within the scope of the present invention, a speed of rotation of the rotor of the kneader less than or equal to 250 rpm, notably greater than or equal to 50 rpm and in particular, comprised between 100 and 250 rpm. As a non-limiting example, in the case of a standardized kneader, the stirring speed is 200 rpm.

Step (b) of the method according to the invention is carried out at a temperature comprised between 10° C. and 40° C., advantageously between 15° C. and 30° C. and more particularly, at room temperature (i.e. 23° C.±5° C.) for a period of more than 2 min, notably comprised between 4 min and 1 h and in particular comprised between 5 min and 30 min.

One skilled in the art will be able to determine the amount of aluminosilicate source to be used within the scope of the present invention according to his/her knowledge in the field of geopolymerization as well as on the nature of the organic liquid applied and on the amount of organic liquid and of activation solution applied.

Advantageously, in the method according to the present invention, the activation solution/MK mass ratio with the activation solution term representing the mass of the activation solution containing the organic liquid and optionally a surfactant (expressed in g) and MK representing the mass of the aluminosilicate source used (expressed in g) is advantageously comprised between 0.6 and 2 and notably between 1 and 1.5. As a particular example, the activation solution/MK ratio is of the order of 1.28 (i.e. 1.28±0.1). An activation solution/MK ratio comprised between 1.2 and 1.4 gives the possibility of guaranteeing an amount and a size of the pores in the geopolymer favorable to encapsulation and notably to micro-encapsulation of organic liquid.

Further, in addition to the aluminosilicate source, sand, granulate and/or fines may be added to the activation solution during step (b) of the method according to the invention.

By «granulate», is meant a granular, natural, artificial or recycled material for which the average grain size is advantageously comprised between 10 and 125 mm.

The fines also called «fillers» or «addition fines», represents a finely divided dry product, stemming from the cutting, sawing or working of natural rocks, of granulates as defined earlier and ornamental stones. Advantageously, the fines have an average grain size notably comprised between 5 and 200 μm.

Sand, granulate and/or fines are added in order to better regulate the rise in temperature during step (c) of the method but also for optimizing the physical and mechanical properties of the obtained composite material.

The sand optionally added during step (b) may be limestone sand or siliceous sand. Advantageously, this is a siliceous sand which gives the possibility of attaining better results as regards the optimization of the physical and mechanical properties of the obtained composite material. By «siliceous sand», is meant within the scope of the present invention, a sand consisting of more than 90%, notably more than 95%, in particular more than 98% and, more particularly more than 99% of silica ($SiO_2$). The siliceous sand applied in the present invention advantageously has an average grain size of notably less than 10 mm, notably less than 7 mm and in particular less than 4 mm. As a particular example, it is possible to use a siliceous sand having an average grain size comprised between 0.2 and 2 mm.

When sand is added in addition to the aluminosilicate source, to the activation solution, the mass ratio between sand and aluminosilicate source is comprised between 2/1 and 1/2, notably between 1.5/1 and 1/1.5 and, in particular, between 1.2/1 and 1/1.2.

Step (c) of the method according to the invention consists of submitting the mixture obtained in step (b) to conditions allowing hardening of the geopolymeric mixture.

Any technique known to one skilled in the art for hardening a geopolymeric mixture in which the organic liquid is present, may be used during the hardening step of the method.

The conditions allowing hardening during step (c) advantageously comprise a curing step optionally followed by a drying step. The curing step may be accomplished in open air, under water, in various hermetic molds, by humidification of the atmosphere surrounding the geopolymeric mixture or by applying an impervious coating on said mixture. This curing step may be applied under a temperature comprised between 10 and 80° C., notably between 20 and 60° C. and in particular between 30 and 40° C. and may last for between 1 and 40 days, or even longer. It is obvious that the duration of the curing depends on the conditions applied during the latter and one skilled in the art will be able to determine the most suitable duration, once the conditions are defined and optionally by routine tests.

When the hardening step comprises a drying step, in addition to the curing step, this drying may be accomplished at a temperature comprised between 30 and 90° C., notably between 40 and 80° C. and, in particular, between 50 and 70° C. and may last for between 6 h and 10 days, notably between 12 h and 5 days and, in particular, between 24 and 60 h.

Further, before hardening the geopolymeric mixture in which the organic liquid is present, the latter may be placed in molds so as to give it a predetermined shape following this hardening.

The present invention also relates to a method for treating and/or inertising an organic liquid consisting of preparing a composite material from said organic liquid according to a method as defined earlier.

By «treatment and/or inertization of an organic liquid», is meant within the scope of the present invention, solidification and stabilization of said organic liquid into a solid material having reduced water permeability and leachable fraction.

The present invention also relates to a composite material which may be prepared by applying the method according to the present invention.

Advantageously and as explained earlier, the composite material according to the invention appears as a geopolymer (or geopolymeric matrix) wherein microbeads and/or nanobeads of organic liquid are coated.

In the material object of the present invention, the organic liquid is incorporated into the geopolymeric matrix up to an incorporation level of 70% by volume based on the total volume of said composite material and typically at an incorporation level comprised between 0.5 and 70% by volume based on the total volume of said composite material. In other words, the organic liquid represents between 0.5 and 70% by volume based on the total volume of the composite material object of the invention or of the composite material prepared according to the method object of the invention. Advantageously, this incorporation level is comprised between 1 and 60%, notably between 2 and 50% and, in particular, between 5 and 40% by volume based on the total volume of said composite material. As particular examples, this incorporation level may be of the order of 20% (i.e. 20%±5%) or of the order of 30% (i.e. 30%±5%) by volume based on the total volume of said composite material.

Other features and advantages of the present invention will further become apparent to one skilled in the art upon reading the examples below given as an illustration and not as a limitation, with reference to the appended figures.

SHORT DESCRIPTION OF DRAWINGS

DETAILED DISCUSSION OF PARTICULAR EMBODIMENTS

A geopolymeric mortar was prepared with 20% by volume of oil.

I. Raw Materials

The products used for the geopolymer are metakaolin from Pieri Premix MK (Grade Construction Products), NaOH (Prolabo, 98%), $SiO_2$ (Tixosil, Rhodia), siliceous sand (Sibelco) and motor oil as an organic waste.

The composition is given in the table 1 below.

TABLE 1

Composition of the mortar for micro-encapsulation of oil

| | Binding composition (in g) | Activation solution/metakaolin mass |
|---|---|---|
| Geopolymeric mortar with oil | $SiO_2$: 223<br>NaOH: 242<br>Metakaolin: 882<br>Sand: 821<br>Oil: 321 | 1.28 |

II. Operation Procedure

Figure 1:
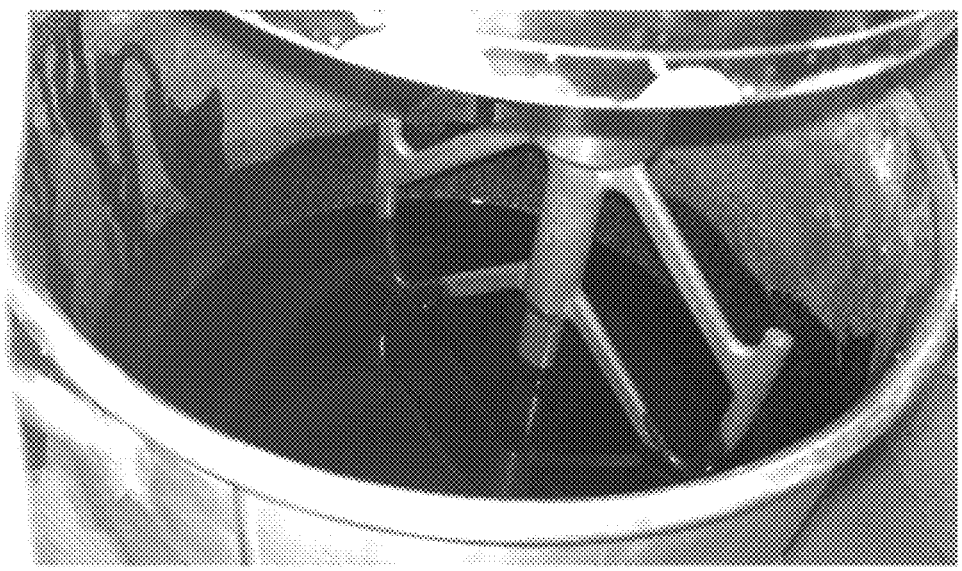
FIG. 1 is a view of an activation solution with 30% by mass of oil.
Figure 2:
FIG. 2 is a view of the kneading of the activation solution with the oil after adding metakaolin.
Figure 3:
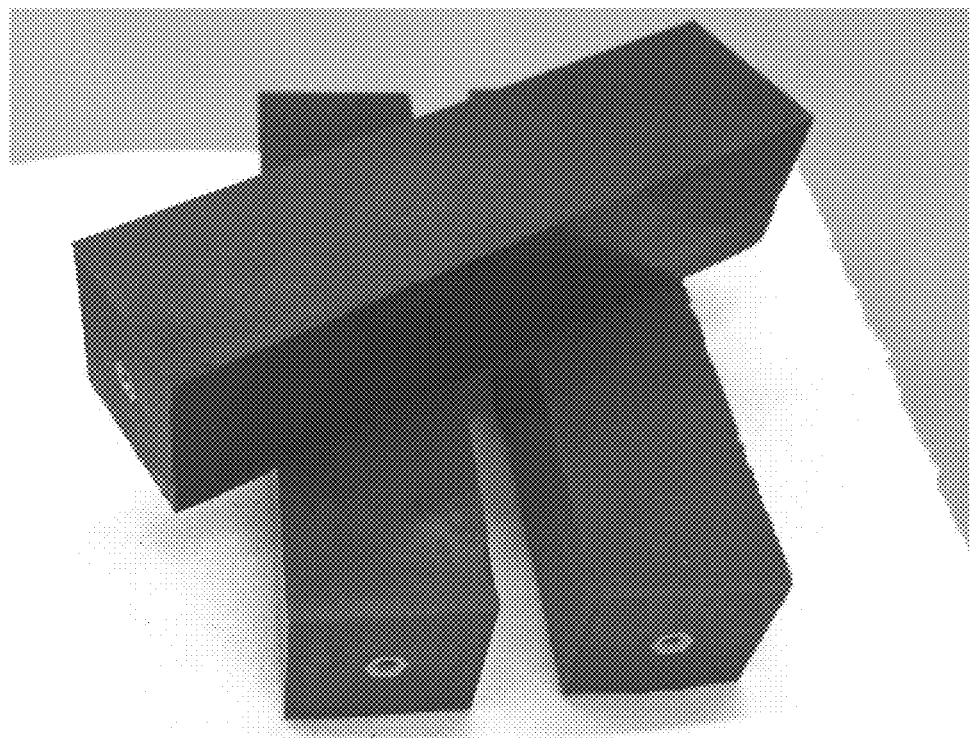
FIG. 3 is a view of geopolymer specimens containing 20% by volume of oil.

II.1. Preparation of the Activation Solution
The steps of this preparation are the following:
Preparation of a concentrated soda solution (10 M),
Addition of Tixosil silica with stirring in order to obtain an activation solution,
Addition of oil to the activation solution,
Sustained stirring at 300 rpm for a minimum of 10 hours in order to obtain a uniform solution,
Transfer of the mixture into a kneader with a view to geopolymerization (FIG. 1).
II.2. Geopolymerization
The metakaolin+sand mixture is added to the activation solution (FIG. 2).
The geopolymeric mortar containing the oil is poured into molds in order to obtain measurement specimens (FIG. 3). The hermetic molds are kept in an oven with a controlled atmosphere (20° C. at atmospheric pressure) during the whole of the curing which lasts for at least three days.

III. Obtained Material and its Properties

Obtaining a monolithic geopolymer block with oil is clearly visible in FIG. 3.

These specimens were therefore characterized by mechanical strength tests after storage in air, in a bag and sealed, in the form of two independent tests (test 1 and test 2). The results are shown in Table 2. The geopolymer has good mechanical properties (>8 MPa compatible with the ANDRA requirements) and integrity of the materials after 28 days of preservation is demonstrated.

TABLE 2

Mechanical properties at 28 days of the geopolymers containing 20% by volume of oil

| | Storage in air | Storage in bag | Storage under water |
|---|---|---|---|
| Flexure (MPa) | | | |
| Test 1 | 2.235 | 3.095 | 2.612 |
| Test 2 | 3.574 | 2.998 | 2.509 |

TABLE 2-continued

Mechanical properties at 28 days of the geopolymers containing 20% by volume of oil

|  | Storage in air | Storage in bag | Storage under water |
|---|---|---|---|
| Compression (MPa) | | | |
| Test 1 | 25.69 | 23.81 | 22.63 |
| Test 2 | 29.00 | 23.06 | 23.44 |

IV. Other Example According to the Invention

A geopolymer paste was prepared with 20% by volume of scintillator liquid Ultima gold XR from Perkin Elmer.

The composition and the mechanical properties are given in Table 3.

TABLE 3

Composition of the mortar for microencapsulation of scintillator liquid

| | Binding composition (in g) | Water/metakaolin | Mechanical properties at 28 days in air |
|---|---|---|---|
| Geopolymer paste with scintillator liquid | $SiO_2$: 21.6<br>NaOH: 24<br>Metakaolin: 79.7<br>Scintillator liquid: 22 | 0.77 | 30 MPa in compression<br>5.4 MPa in flexure |

The operating procedure for preparing the geopolymer paste with the scintillator liquid is identical with the one shown earlier with oil.

Figure 4:
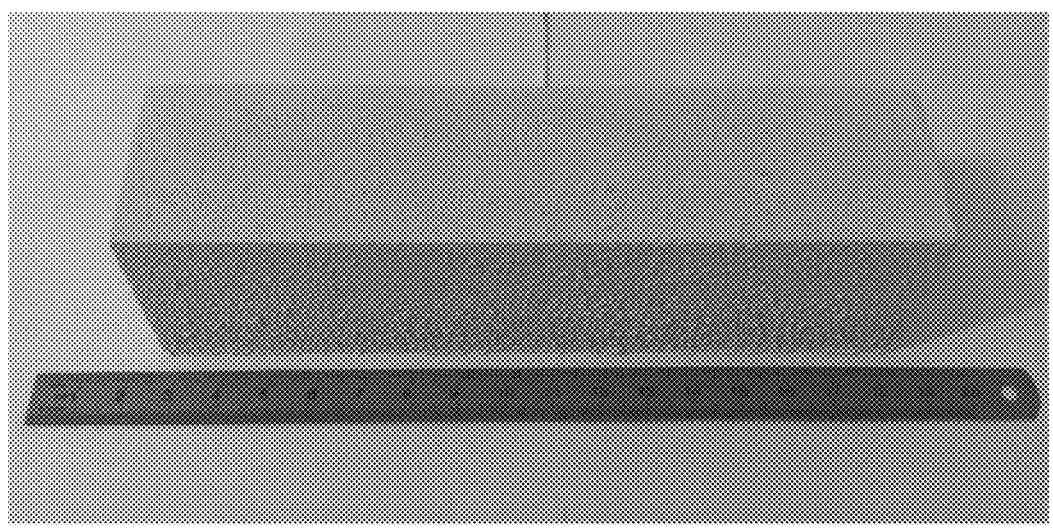
FIG. 4 is a view of a specimen 4×4×16 cm³ of geopolymer containing 20% by volume of scintillator liquid.

The geopolymer mortar containing the scintillator liquid is poured into molds in order to obtain measurement specimens (FIG. 4).

REFERENCES

[1] IAEA. Treatment and conditioning of radioactive organic liquids, IAEA-TECDOC656. 1992.
[2] Greenhalgh W. HEDL-SA-3377-FA, Handford Engineering Development Laboratory, USA. 1985.
[3] Natali Sora I, Pelosato R, Botta D, Dotelli G. Chemistry and microstructure of cement pastes admixed with organic liquids. Journal of the European Ceramic Society. 2002; 22: 1463-73.
[4] Montgomery D M, Sollars C J, Perry R. Optimization of Cement-Based Stabilization/Solidification of Organic-Containing Industrial Wastes Using Organophilic Clays. Waste Management & Research. 1991; 9: 21-34.
[5] Pollard S J T, Montgomery D M, Sollars C J, Perry R. Organic compounds in the cement-based stabilisation/solidification of hazardous mixed wastes—Mechanistic and process considerations. Journal of Hazardous Materials. 1991; 28: 313-27.
[6] Hebatpuria V M, Arafat H A, Rho H S, Bishop P L, Pinto N G, Buchanan R C. Immobilization of phenol in cement-based solidified/stabilized hazardous wastes using regenerated activated carbon: leaching studies. Journal of Hazardous Materials. 1999; 70: 117-38.
[7] Zhu L, Chen B, Shen X. Sorption of Phenol, p-Nitrophenol, and Aniline to Dual-Cation Organobentonites from Water. Environmental Science & Technology. 1999; 34: 468-75.
[8] Cassidy H, Kelley D. Oil Immobilization Program at Sellafield: An Innovative Approach. WM 07. Tucson, USA 2007.
[9] Nochar Newsletter. Volume 3, No. 1. 2005.
[10] International application in the name of OUT-OTEC OYJ published on Jun. 23, 2011.

The invention claimed is:

1. A method for preparing a composite material from an organic liquid, comprising:
   preparing a geopolymer by dissolution/polycondensation of at least one aluminosilicate source in an activation solution including said organic liquid,
   said organic liquid representing 20% to 70% by volume based on a total volume of said composite material,
   said organic liquid including at most 50% by mass of triglycerides based on a total dry mass of said organic liquid, and
   wherein said preparing the geopolymer includes
   a) preparing the activation solution including said organic liquid and at least one surfactant, said surfactant being present in a proportion of 1% to 10% based on a total volume of the activation solution,
   b) adding the at least one aluminosilicate source to the activation solution in step (a) to obtain a mixture, and
   c) subjecting the mixture in step (b) to conditions allowing hardening of the geopolymer,
   wherein said composite material is a geopolymeric matrix in which at least one of microbeads and nanobeads of said organic fluid are trapped or coated, and
   wherein said organic liquid comprises at least one compound selected from the group consisting of a commercial scintillator liquid, benzene, toluene, xylene, ethylbenzene, kerosene, hexane, cyclohexane, octane, ethylcyclohexane, dodecane, eicosane, phenol, dichloromethane, trichloroethane, dichlorobenzene, trichloroethylene, 2-octane, 4-dodecanone, tributyl phosphate (TBP), tetrahydrofurane (THF), and diethyl ether.

2. The method according to claim 1, wherein said organic liquid is in a supported form.

3. The method according to claim 2, wherein said supported form is earth, sand, clay, rubble, granulate, gravel, or one of their mixtures.

4. The method according to claim 1, wherein said organic liquid comprises at least one of a heavy metal, a trace element, or a radioelement.

5. The method according to claim 1, wherein said activation solution contains at least one silicate component selected from the group consisting of silica, colloidal silica, and glassy silica.

6. The method according to claim 1,
   wherein the activation solution/MK mass ratio with an activation solution term representing the mass of activation solution containing the organic liquid (expressed in g) and MK representing the aluminosilicate source mass (expressed in g) used is between 0.6 and 2.

7. The method according to claim 1,
   wherein the activation solution/MK mass ratio with an activation solution term representing the mass of activation solution containing the organic liquid (expressed in g) and MK representing the aluminosilicate source mass (expressed in g) used is between 1 and 1.5.

8. The method according to claim 6,
   wherein the activation solution/MK mass ratio with the activation solution term representing the mass of activation solution containing the organic liquid and a surfactant (expressed in g) and MK representing the aluminosilicate source mass (expressed in g) used is between 1 and 1.5.

9. The method according to claim 1, wherein, in addition to the at least one aluminosilicate source, sand, granulate, and/or fines are added to the activation solution during said step (b).

10. The method according to claim 1, wherein the conditions allowing hardening during said step (c) comprise a curing step.

11. The method according to claim 10, wherein the curing step is followed by a drying step.

12. A method for treatment and/or inertization of an organic liquid, comprising:
preparing the composite material from said organic liquid according to the method as defined in claim 1.

* * * * *